(12) United States Patent
Yanagimoto (10) Patent No.: US 7,441,991 B2
(45) Date of Patent: Oct. 28, 2008

(54) CHAMFERING TOOL

(76) Inventor: Osamu Yanagimoto, 204-1, Kozubashi, Tamatsu-cho, Nishi-ku, Kobe-shi, Hyogo (JP) 6512122

( * ) Notice: Subject to any disclaimer, the term of this patent is extended or adjusted under 35 U.S.C. 154(b) by 399 days.

(21) Appl. No.: 10/527,491

(22) PCT Filed: Aug. 20, 2004

(86) PCT No.: PCT/JP2004/011989

§ 371 (c)(1),
(2), (4) Date: Mar. 11, 2005

(87) PCT Pub. No.: WO2006/018894

PCT Pub. Date: Feb. 23, 2006

(65) Prior Publication Data

US 2007/0122245 A1      May 31, 2007

(51) Int. Cl.
  *B23B 5/16* (2006.01)
(52) U.S. Cl. .......................... 407/53; 407/61; 408/227; 408/229
(58) Field of Classification Search ................ 407/113, 407/53, 57, 61; 408/211, 223, 227, 229, 408/230, 199; *B23B 5/16*
See application file for complete search history.

(56) References Cited

U.S. PATENT DOCUMENTS 2,865,237 A * 12/1958 Degenhart .................. 408/201
3,402,624 A * 9/1968 Bollito et al. ............... 408/211
5,188,490 A * 2/1993 Muendlein et al. .......... 408/146
6,663,326 B1 * 12/2003 Hiroyasu et al. ............ 408/144
2007/0051428 A1 * 3/2007 Sullivan ................... 144/136.1

FOREIGN PATENT DOCUMENTS

| CN | 1376552 A | 10/2002 |
|---|---|---|
| JP | 61142009 | 6/1986 |
| JP | 5-111815 A | 5/1993 |
| JP | 9-277111 A | 10/1997 |
| JP | 11-104916 | 4/1999 |
| JP | 2002283140 A | 10/2002 |
| JP | 2002-281340 A | 10/2003 |

* cited by examiner

*Primary Examiner*—Boyer D. Ashley
*Assistant Examiner*—Sara Addisu
(74) *Attorney, Agent, or Firm*—Jason A. Bernstein; Powell Goldstein LLP (57) ABSTRACT

A circular truncated cone-shaped cutting section (3) of a chamfering tool (1) is formed with a first blade section (31) which is tilted so that a chip is discharged to a side of a shank section (2), and a second blade section (32) which is tilted so that the chirp is discharged to a direction opposite to the side of the shank section (2) in a peripheral direction with a gap. The chamfering tool (1) is rotated, and the first blade section (31) and the second blade section (32) are alternately brought into contact with an edge of an object to be worked so that the edge is chamfered. As a result, occurrence of a secondary burr on the edge is suppressed.

4 Claims, 8 Drawing Sheets

CHAMFERING TOOL

TECHNICAL FIELD

The present invention relates to a chamfering tool that removes a burr occurring on a peripheral edge or the like of a cutting hole provided to an object to be worked and chamfers an edge.

BACKGROUND ART

Figure 8A:
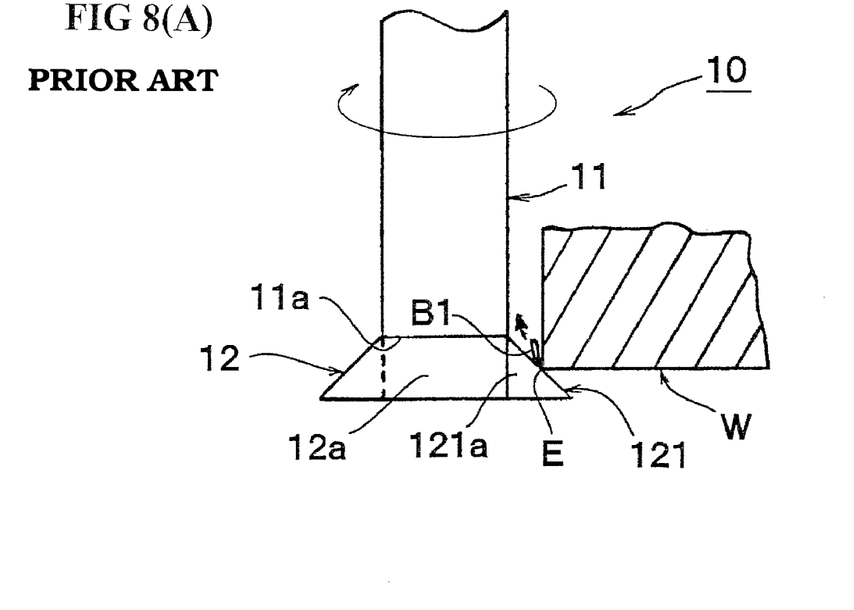
FIGS. 8(a) and 8(b) are diagrams illustrating a conventional chamfering tool.
Figure 8B:
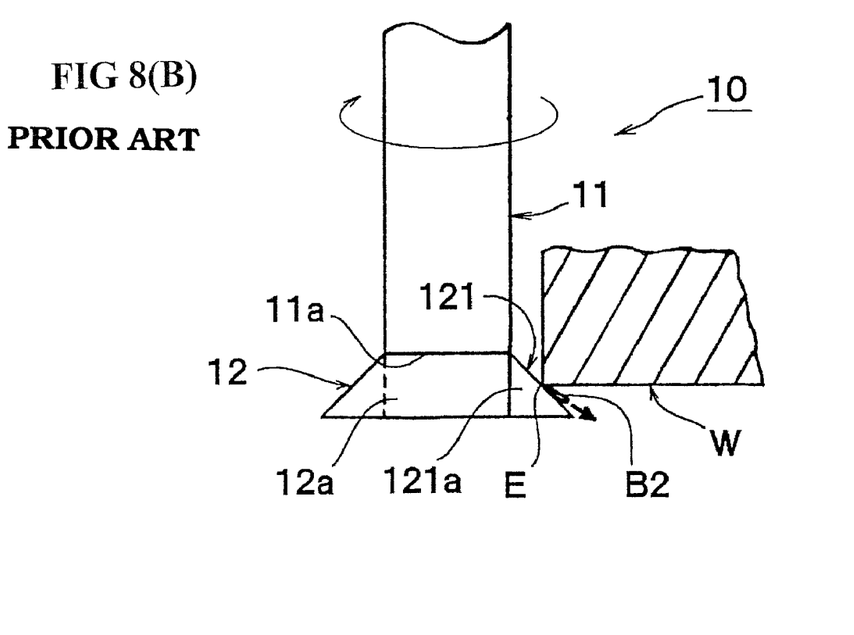

In the case where a circular hole is provided to an object to be worked such as aluminum cast by machining, an edge is formed on a peripheral edge of the circular hole, and a burr occurs around the edge. In order to remove such a burr and chamfer the edge, a chamfering tool 10 shown in FIGS. 8(*a*) and 8(*b*) is conventionally used. The chamfering tool 10 is a rotational tool, and is composed of a shank section 11 fixed to a rotational chuck, and a circular truncated cone-shaped cutting section 12 provided integrally with a forward end 11*a* of the shank section 11. The cutting section 12 is provided with a blade section 121 on an outer peripheral surface 12*a* so that the blade section 121 faces a rotating direction (direction of an arrow in the drawings). The blade section 121 can remove a burr occurring on the edge E of an object to be worked which is brought into contact with the blade section 121 and chamfer the edge E.

Patent Literature 1: Japanese Patent Application Laid-Open No. 11-104916 (1999).

An angle of a cutting face 121*a* of the blade section 121 is tilted to the rotating direction so that a chip generated due to a burring work and a chamfering work is discharged outside from the blade section 121. The chip is discharged to the side of the shank section 11 (upper side in FIGS. 8(*a*) and 8(*b*)) or a side opposite to the side of the shank section 11 (lower side in FIGS. 8(*a*) and 8(*b*)) due to the tilt angle of the cutting face 121*a*. That is to say, when the cutting face 121*a* is tiled so as to face the side of the shank section 11, as shown in FIG. 8(*a*), the chip is discharged to the side of the shank section 11. When the cutting face 121*a* is tiled so as to face the side opposite to the side of the shank section 11, as shown in FIG. 8(*b*), the chip is discharged to the side opposite to the side of the shank section 11.

The chip discharged out of the blade section 121 is not always separated from the object to be worked W completely, and as shown in FIGS. 8(*a*) and 8(*b*), they occasionally remain as secondary burrs B1 and B2. Since the secondary burrs B1 and B2 deteriorate the quality and the safety of products, they should be eliminated completely. In the case where, however, the secondary burrs are removed by the chamfering tool 10, it is necessary to move a position of the chamfering tool 10 and change its angle with respect to the edge E, thereby making working facility complicated. Further, when another chamfering tool is used, another working facility is required, thereby causing an increase in facility space.

DISCLOSURE OF THE INVENTION

In order to solve the above problem, it is an object of the present invention to provide a chamfering tool that does not allow a chip to remain on an object to be worked.

The invention from a first aspect provides a chamfering tool characterized by including a cutting section whose outer surface is formed by a plane surface or a curved surface, the cutting section being slid to a direction where an edge extends relatively with respect to the edge of an object to be worked so that the edge is chamfered, wherein the outer surface is formed with a first blade section which is tilted so that a chip is discharged to one side of the edge, and a second blade section which is tilted so that the chip is discharged to the other side different from the former side in a sliding direction of the cutting section with a gap.

The invention from a second aspect provides a chamfering tool characterized by including a cutting section whose outer surface is formed by a plane surface or a curved surface, the cutting section being slid to a direction where an edge extends relatively with respect to the edge of an object to be worked so that the edge is chamfered, wherein the outer surface is formed with a first blade section having a first cutting face tilted so as to face one side of the edge, and a second blade section having a second cutting face tilted so as to face the other side different from the former side in a sliding direction of the cutting section with a gap.

According to the chamfering tool from the first or the second aspect, the following excellent effect is produced. The chip, which is cut by any one of the first blade section and the second blade section and is discharged out of the blade sections, becomes a secondary burr on one side of the edge. When the other blade section passes through the secondary burr, the burr is sprang back and touches the other blade section so as to be sheared to an opposite direction. As a result, the burr is completely separated to be removed from the object to be worked. The edge, therefore, can be chamfered or the burr can be removed without the secondary burr.

Since the first blade section and the second blade section are provided on the same outer surface in the sliding direction to be a cutting direction with a gap, they do not interfere with each other. The chamfering tool, therefore, can be manufactured easily.

The invention from a third aspect provides a chamfering tool characterized by including: a shank section to be attached to a rotational chuck; and a cutting section which is provided to a forward end of the shank section and whose outer peripheral surface is formed by a cylindrical rotational surface or a conical rotational surface, the cutting section being brought into contact with an edge of an object to be worked so that the edge is chamfered, wherein the outer peripheral surface is formed with a first blade section which is tilted so that a chip is discharged to a side of the shank section, and a second blade section which is tilted so that the chip is discharged to a side opposite to the side of the shank section in a peripheral direction of the outer peripheral surface with a gap.

The invention from a fourth aspect provides a chamfering tool characterized by including: a shank section to be attached to a rotational chuck; and a cutting section which is provided to a forward end of the shank section and whose outer peripheral surface is formed by a cylindrical rotational surface or a conical rotational surface, the cutting section being brought into contact with an edge of an object to be worked so that the edge is chamfered, wherein the outer peripheral surface is formed with a first blade section having a first cutting face tilted so as to face a side of the shank section, and a second blade section having a second cutting face tilted so as to face a side opposite to the side of the shank section in a peripheral direction of the outer peripheral surface with a gap.

According to the chamfering tool from the third or the fourth aspect, the following excellent effect is produced. The chip, which is cut by any one of the first blade section and the second blade section and is discharged to the side of the shank section or the opposite side, is not separated from the object to be worked so as to become a secondary burr. The secondary burr is sprang back when the other blade section passes therethrough, and touches the other blade section. As a result, the burr is sheared to the opposite direction, and is separated to be removed from the object to be worked completely. The edge, therefore, can be chamfered or the burr can be removed without the secondary burr.

Further, since the first blade section and the second blade section are formed on one outer peripheral surface in the peripheral direction with a gap, they do not interfere with each other. The chamfering tool, therefore, can be manufactured easily.

The invention from a fifth aspect provides the chamfering tool depending from the third or the fourth aspect characterized in that the first blade section and the second blade section are formed alternately in the peripheral direction of the outer peripheral surface.

According to the chamfering tool from the fifth aspect, in addition to the effects obtained by the chamfering tool from the third or the fourth aspect, the following excellent effect is produced. Since the first blade section and the second blade section are formed alternately in the peripheral direction of the outer peripheral surface, before the secondary burr generated by the first blade section or the second blade section grows larger, it is separated to be removed by the other blade section. As a result, working resistance for removing the secondary burr can be suppressed small, and the life of the chamfering tool can be maintained long.

The invention form a sixth aspect provides the chamfering tool from the third or the fourth aspect, characterized in that the first blade section and the second blade section are formed so as to be symmetrical with respect to a rotating center axis of the cutting section.

According to the chamfering tool from the sixth aspect, in addition to the effects obtained by the chamfering tool from the third or the fourth aspect, the following effect is produced. Since the first blade section and the second blade section are formed so as to be symmetrical with respect to the rotating center axis of the cutting section, balance at the time of rotating the chamfering tool is satisfactory and thus rotation deflection hardly occurs. As a result, the life of the chamfering tool is maintained long.

THE BEST MODE FOR CARRYING OUT THE INVENTION

The present invention is explained in detail below with reference to the accompanying diagrams.

Figure 1A:
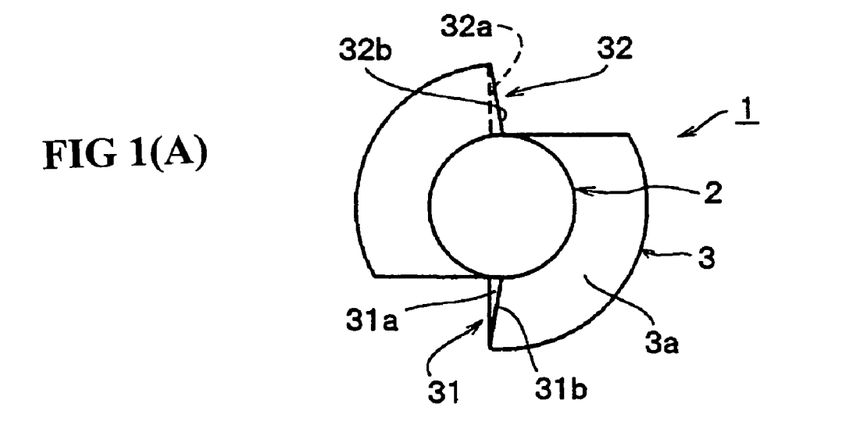
FIGS. 1(a) and 1(b) are respectively a plan view and a front view illustrating a chamfering tool according to an embodiment of the present invention.
Figure 1B:
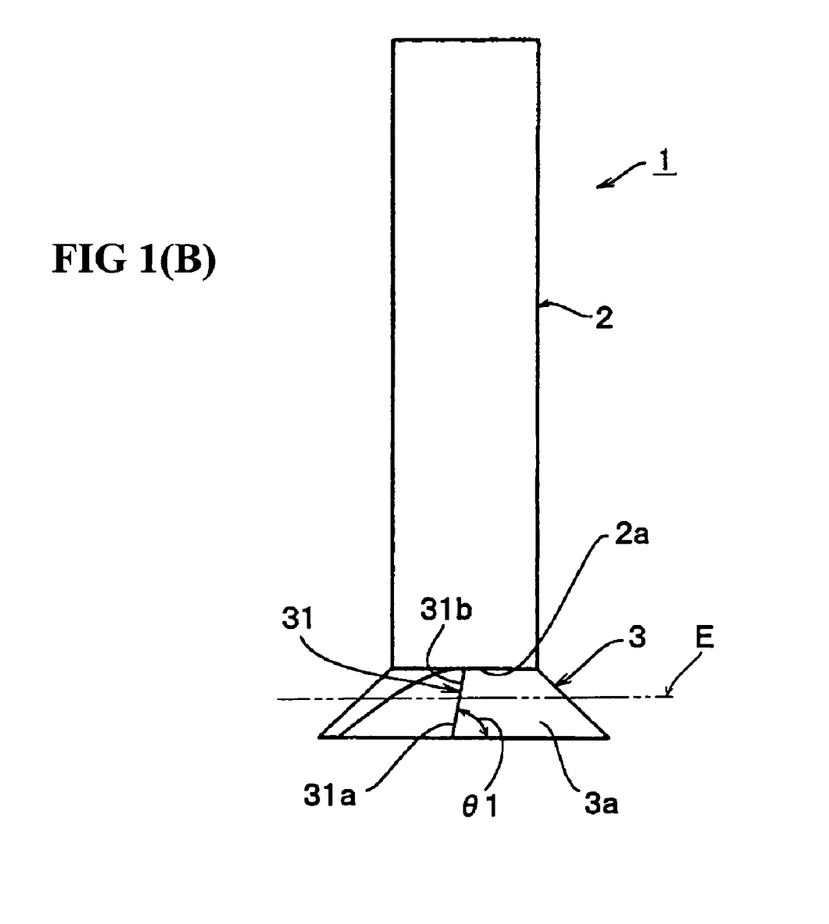
Figure 2:
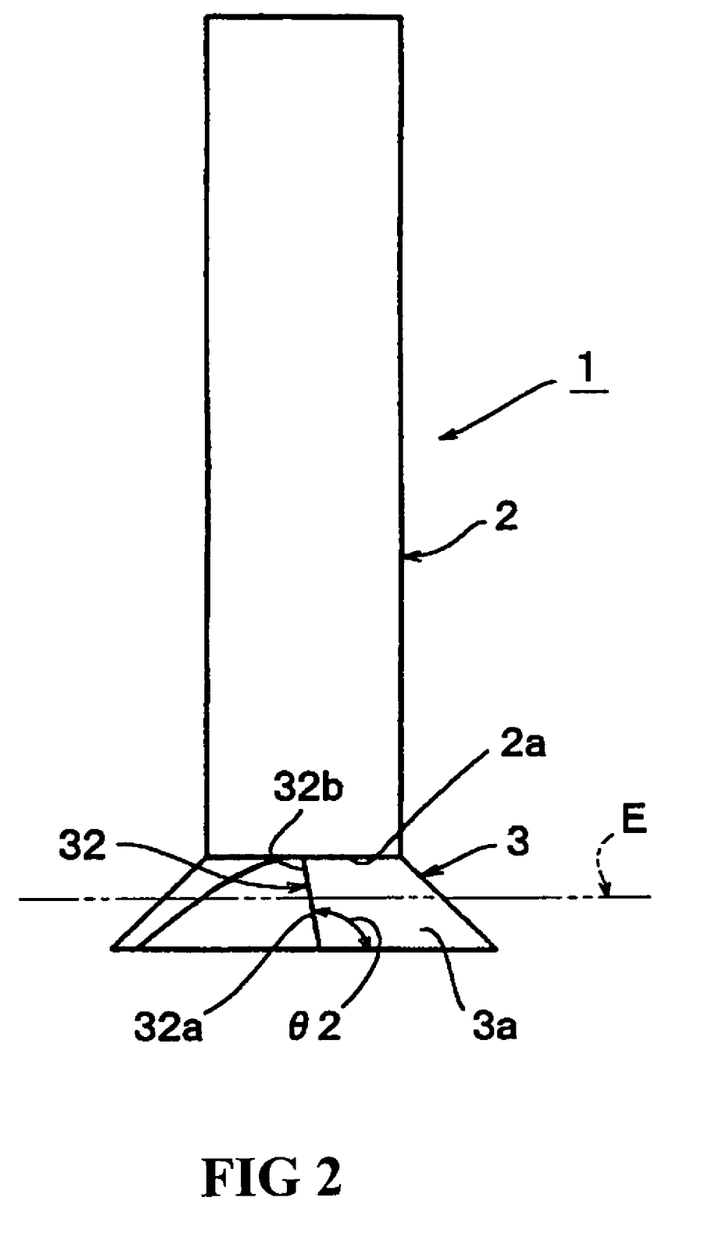
FIG. 2 is a rear view illustrating the chamfering tool according to the embodiment of the present invention.
Figure 3A:
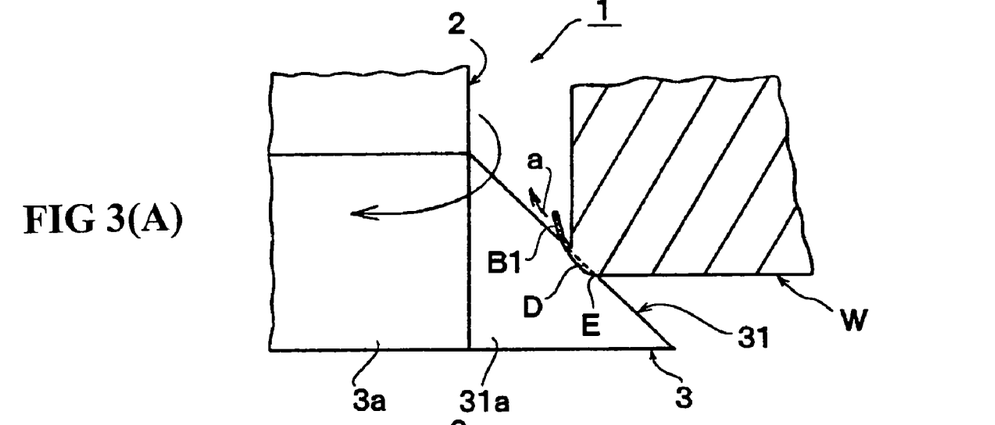
FIGS. 3(a), 3(b), and 3(c) are diagrams explaining functions of the chamfering tool according to the embodiment of the present invention.
Figure 3B:
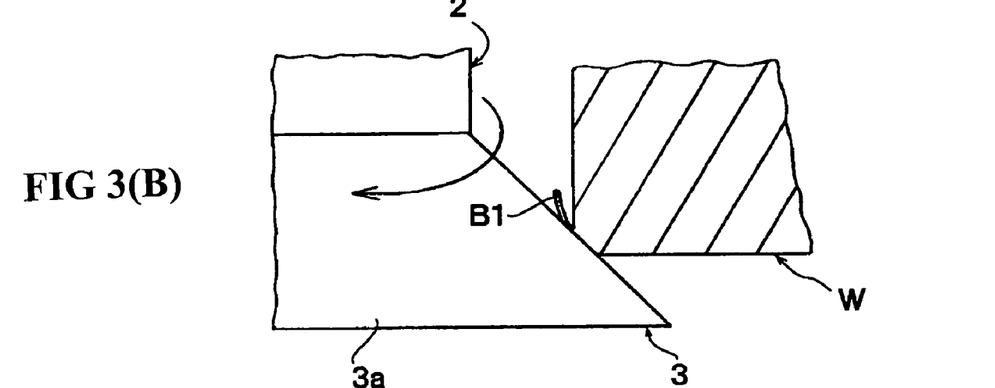
Figure 3C:
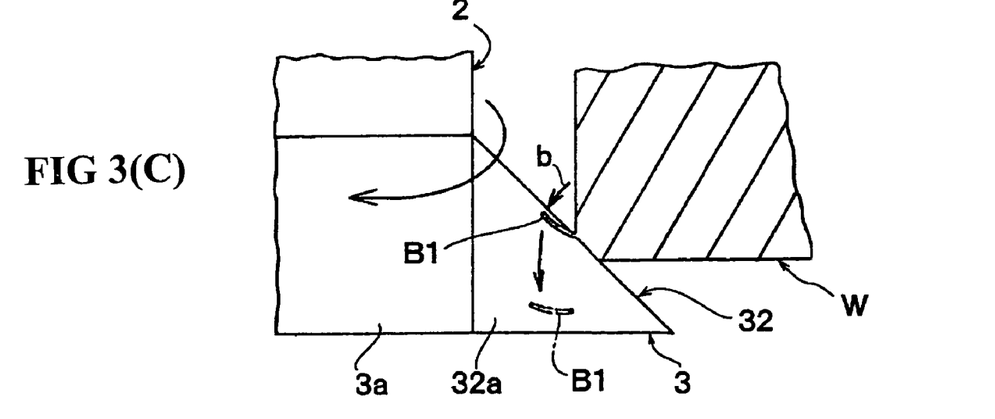

FIGS. 1(a) to 3(c) are diagrams illustrating one example of the embodiment of the present invention. FIG. 1(a) is a plan view illustrating a chamfering tool 1 according to the embodiment, and FIG. 1(b) is a front view. FIG. 2 is a rear view, and FIGS. 3(a) to 3(c) are diagrams explaining the functions of the chamfering tool 1.

As shown in FIGS. 1(a) and 1(b), the chamfering tool 1 has a bar-shaped shank section 2, and a cutting section 3 provided integrally with a forward end 2a of the shank section 2. The chamfering tool 1 is a rotational tool in which a rear end of the shank section 2 is attached to a rotational chuck (not shown), and it chamfers an edge or the like of an object to be worked which is brought into contact with the cutting section 3 to be rotated. The cutting section 3 is formed into a circular truncated cone shape, and a first blade section 31 and a second blade section 32 are formed on its outer peripheral surface 3a (conical rotational surface) with an gap in a peripheral direction.

The first blade section 31 is composed of a first cutting face 31a formed by cutting a material of the cutting section 3 from the outer peripheral surface 3a towards a rotating center axis, and a first cutting blade 31b formed on a cross line between the first cutting face 31a and the outer peripheral surface 3a. As shown in FIG. 1(b), the first cutting face 31a is tilted at an angle of $\theta 1$ so as to face the side of the shank section 2 (upper side in FIG. 1(b)). The first cutting face 31a is formed so as to direct in a clockwise direction viewed from the shank section 2.

The second blade section 32 is provided to a position where it and the first blade section 31 are approximately symmetrical with respect to a rotating center axis of the cutting section 3. The second blade section 32 is composed of a second cutting face 32a formed by cutting the material of the cutting section 3 from the outer peripheral surface 3a towards the rotating center axis, and a second cutting blade 32b formed on a cross line between the second cutting face 32a and the outer peripheral surface 3a. As shown in FIG. 2, the second cutting face 32a is tilted at an angle of $\theta 2$ so as to face a side opposite to the side of the shank section 2 (lower side in FIG. 2). The second cutting face 32a is formed so as to direct towards the clockwise direction viewed from the shank section 2 similarly to the first cutting face 31a.

When the edge E of the object to be worked W is chamfered by the chamfering tool 1, the chamfering tool 1 is driven to be rotated to the clockwise direction viewed from the shank section 2 by the rotational chuck, and as shown in FIGS. 1(b), 2 and 3(a) to 3(c), the cutting section 3 is brought into contact with the edge E so that the rotating direction is parallel with the edge E. As shown in FIG. 3(a), when the first blade section 31 is brought into contact with the edge E at a predetermined amount of cutting to a rotating radial direction, a chip D is generated. The chip D is moved towards the shank section 2 as shown by an arrow "a" because a component of a force directing above the edge E acts due to the first cutting face 31a tilted so as to face the side of the shank section 2 (upper side in the drawing). A pushing-up force generated by the first cutting face 31a, however, does not act on the chip D which is discharged to the upper side from an area which contacts with the first cutting face 31a. The chip D discharged to the side of the shank section 2, therefore, is not separated from the object to be worked W and remains as the secondary burr B1 above the edge E.

After the first blade section 31 passes through the edge E, as shown in FIG. 3(*b*), the secondary burr B1 is pushed aside by the outer peripheral surface 3*a* of the cutting section 3 so as to slide on the outer peripheral surface 3*a*. Since the outer peripheral surface 3*a*, however, cannot separate the secondary burr B1 from the object to be worked W, the secondary burr B1 remain above the edge E.

When the cutting section 3 further rotates and the second blade section 32 passes through the edge E, the pushing-aside force generated by the outer peripheral surface 3*a* does not act on the secondary burr. As shown by an arrow b in FIG. 3(*c*), the secondary burr B1 is sprang back due to its elasticity so as to be moved to a position where it touches the second cutting face 32*a*. If the second cutting face 32*a* is tiled so as to face the side of the shank section 2 similarly to the first cutting face 31*a*, the second burr B1 is only pushed up above the edge E again and thus is not separated from the object to be worked W.

The second cutting face 32*a*, however, is tiled so as to face a direction opposite to the side of the shank section 2 unlike the first cutting face 31*a*. The secondary burr B1, therefore, is sheared with it being pushed below the edge E by the second cutting face 32*a*, and is separated to be removed from the object to be worked W as shown by an alternate long and short dash line in FIG. 3(*c*). On the contrary to the above-mentioned case, when the second blade section 32 cuts the edge E so that the secondary burr remains below the edge E, the secondary burr is sheared with it being pushed above the edge E by the first cutting face 31*a*, and is separated to be removed from the object to be worked W.

At the time of chamfer using the chamfering tool 1, the first blade section 31 and the second blade section 32 are brought into contact with the edge E alternately. For this reason, the secondary burr generated by the first blade section 31 is separated to be removed by the second blade section 32 which passes thereafter, and the secondary burr generated by the second blade section 32 is separated to be removed by the first blade section 31 which passes thereafter. As a result, the secondary burr generated by any one of the first blade section 31 and the second blade section 32 does not further grow and is separated to be removed. Working resistance to be applied to the chamfering tool 1, therefore, is suppressed small, so that the tool life is maintained long.

Since both the first cutting blade 31*b* of the first cutting section 31 and the second cutting blade 32*b* of the second blade section 32 are formed on one conical rotating surface, when a cutting amount is kept constant, the secondary burr generated on the object to be worked W is eventually removed completely. While the chamfering tool 1 is being rotated at a high speed, it is moved at a low speed such that the first blade section 31 and the second blade section 32 pass through one portion of the edge E at least once with the cutting amount being kept constant. As a result, the edge can be chamfered so that the secondary burr does not remain on the object to be worked W.

The first blade section 31 and the second blade section 32 are formed in the positions which are approximately symmetrical with respect to the rotating center axis of the cutting section 3. For this reason, when the chamfering tool 1 is rotated, its balance is satisfactory and thus a rotation deflection hardly occurs, thereby improving working accuracy and maintaining the tool life long.

Further, since the first blade section 31 and the second blade section 32 are provided in the peripheral direction of the cutting section 3 with a gap, they does not interfere with each other. The first blade section 31 and the second blade section 32, namely, two kinds of blade sections can be, therefore, formed easily on the material of the cutting section 3 formed into a circular truncated cone shape. As a result, since the chamfering tool 1 can be manufactured easily, a manufacturing method, for example, of forming the portion provided with the first blade section 31 and the portion formed with the second blade section 32 separately and joining them need not to be adopted. As a result, there is no fear that the manufacturing cost does not increase and the tool strength is not deteriorated.

Since the first blade section 31 and the second blade section 32 are formed on one rotating surface, a total length of the cutting section 3 in the rotating axial direction can be reduced. The rotation deflection of the chamfering tool due to the working resistance can be suppressed, and thus stable working is ensured.

Figure 4A:
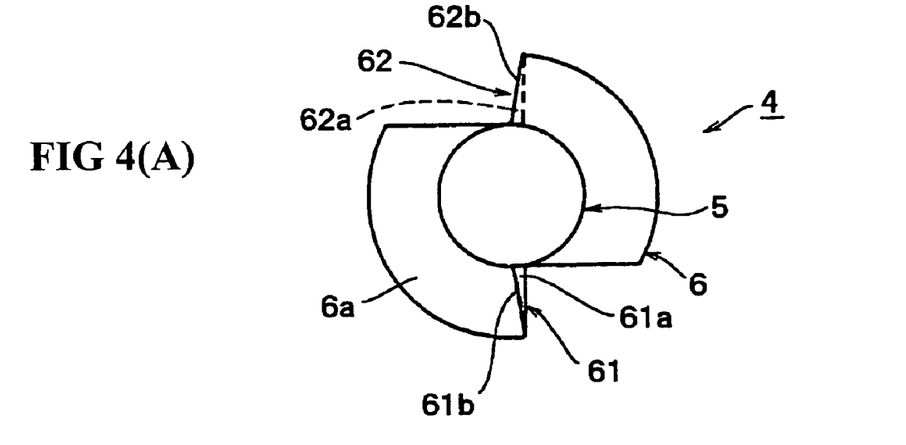
FIGS. 4(a) and 4(b) are respectively a plan view and a front view illustrating the chamfering tool according to another embodiment.
Figure 4B:
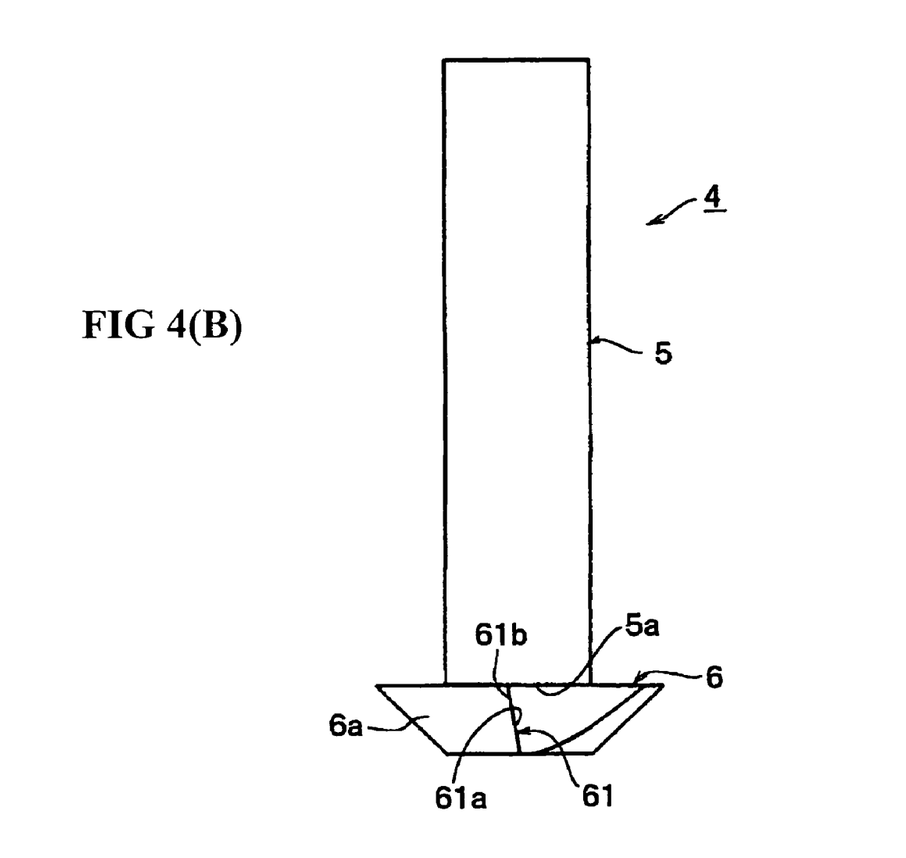

The chamfering tool 1 according to the embodiment is constituted so that a small diameter end of the circular truncated cone-shaped cutting section 3 is jointed to the shank section 2. As shown in FIGS. 4(*a*) and 4(*b*), however, a chamfering tool 4 in which a large diameter end of a circular truncated cone-shaped cutting section 6 is jointed to an end 5*a* of a shank section 5 can be adopted. The cutting section 6 is formed with a first blade section 61 having a cutting face 61*a* tilted so as to face the side of the shank section 5 (upper side in FIG. 4(*b*)), and a second blade section 62 having a cutting face 62*a* tilted so as to face a direction opposite to the side of the shank section 5 (lower side in FIG. 4(*b*)).

A cutting blade 61*b* of the first blade section 61 is formed on a cross line between the first cutting face 61*a* and an outer peripheral surface 6*a* of the cutting section 6, and a cutting blade 62*b* of the second cutting section is formed on a cross line between the second cutting face 62*a* and the outer peripheral surface 6*a*. The chamfering tool 1 chamfers the edge which is hidden viewed from the side of the shank section 2, but the chamfering tool 4 chamfers an edge formed opposed to a shank section 5.

Figure 5A:
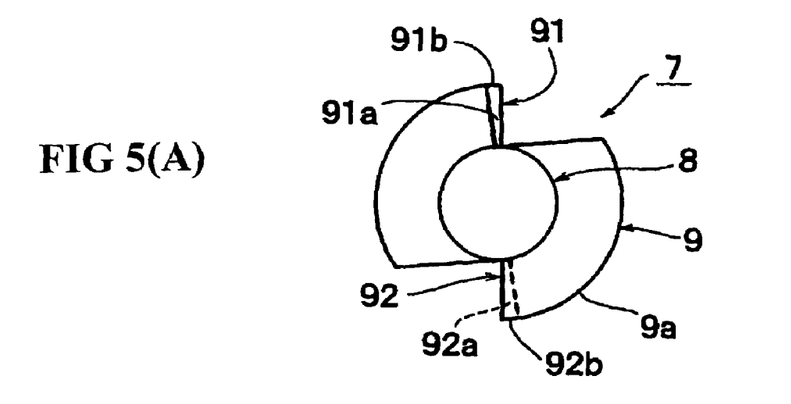
FIG. 5(a) is a plan view illustrating the chamfering tool according to still another embodiment.
Figure 5B:
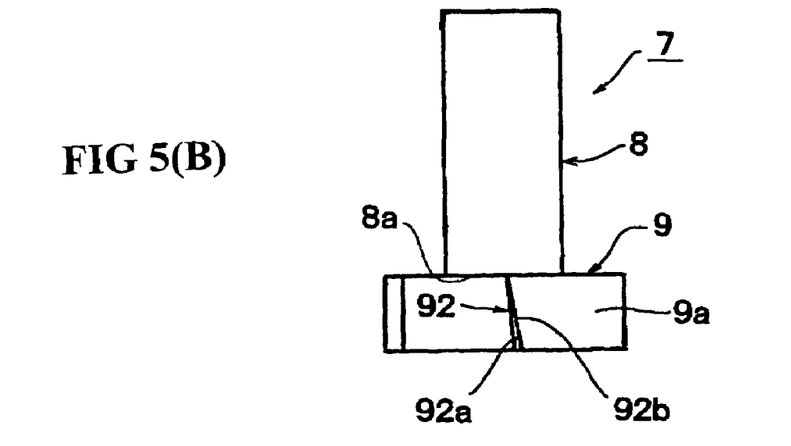
FIG. 5(b) is a front view thereof.
Figure 5C:
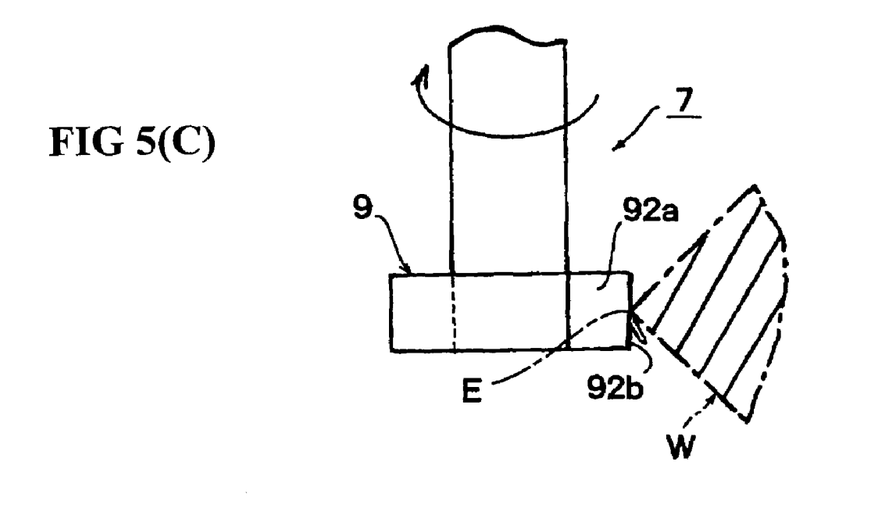
FIG. 5(c) is a diagram illustrating a use state thereof.

The chamfering tool 1 according to the embodiment has the circular truncated cone-shaped cutting section 3, but as shown in FIGS. 5(*a*) to 5(*c*), a cylindrical cutting section 9 can be provided integrally with a shank section 8. In the cutting section 9, a material formed into the cylindrical shape is formed with a first blade section 91 having a cutting face 91*a* tilted so as to face the side of the shank section 8, and a first blade section 92 having a cutting face 92*a* tilted so as to face a direction opposite to the side of the shank section 8.

A cutting blade 91*b* of the first blade section 91 is formed on a cross line between the first cutting face 91*a* and an outer peripheral surface 9*a* of the cutting section 9, and a cutting blade 92*b* of the second blade section is formed on a cross line between the second cutting face 92*a* and the outer peripheral surface 9*a*. As shown in FIG. 5(*c*), a chamfering tool 7 is suitable for chamfering the edge E protruded to a rotating radial direction of the chamfering tool 7.

Figure 6A:
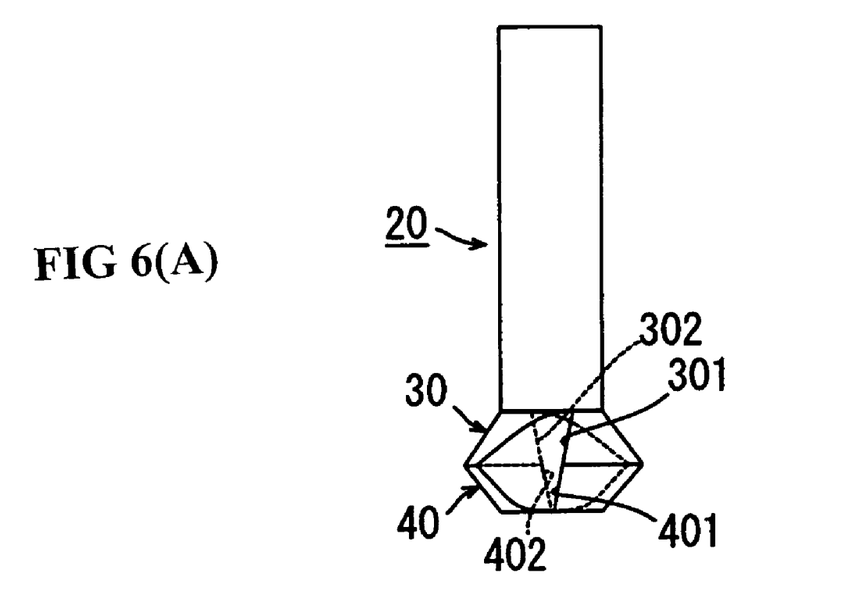
FIG. 6(a) is a front view illustrating the chamfering tool according to still another embodiment.
Figure 6B:
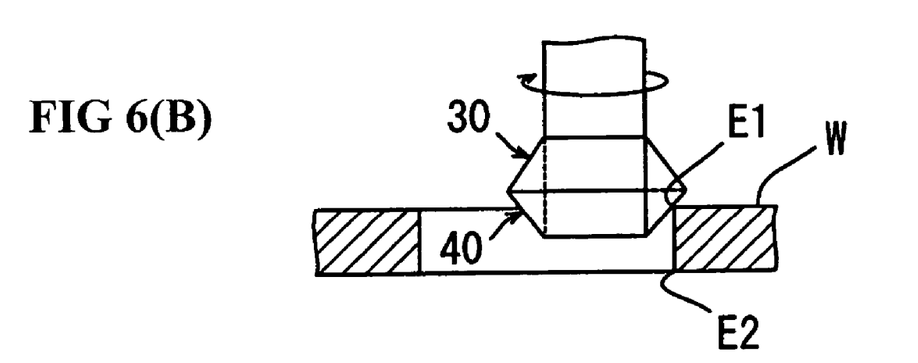
FIGS. 6(b) and 6(c) are diagrams illustrating use states thereof.
Figure 6C:
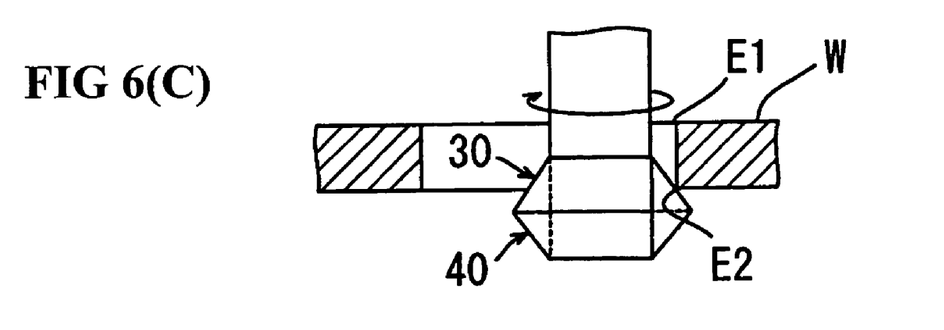

The chamfering tool 1 according to the embodiment has the cutting section 3 of the circular truncated cone shape, but a chamfering tool 20 shown in FIG. 6(*a*) can be adopted. In the chamfering tool 20, a cutting section 30 having a first blade section 301 and a second blade section 302 is jointed to a cutting section 40 having a first blade section 401 and a second blade section 402 in the rotating axial direction. According to the chamfering tool 20, as shown in FIGS. 6(*b*) and 6(*c*), the two edges E1 and E2 formed on a through hole or the like formed on the object to be worked W can be chamfered without replacing the tool and without changing the direction of the tool.

As shown in the drawings, the first blade section 301 of the cutting section 30 and the first blade section 401 of the cutting section 40 are formed continuously, or the second blade section 302 of the cutting section 30 and the second blade section 402 of the cutting section 40 are formed continuously. As a result, the tool can be easily manufactured.

Figure 7A:
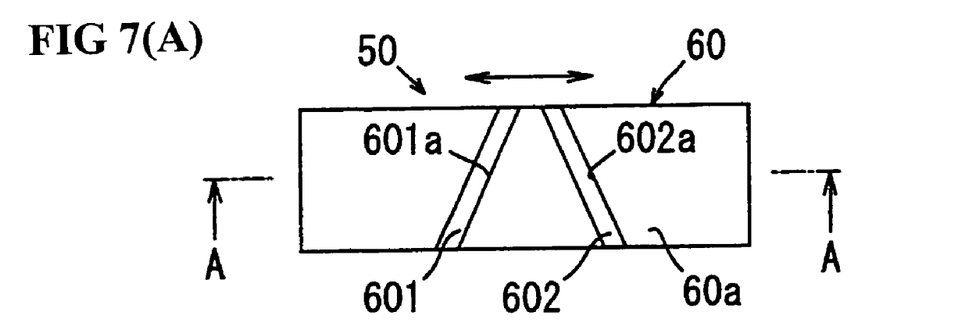
FIG. 7(a) is a bottom view illustrating the chamfering tool according to still another embodiment.
Figure 7B:
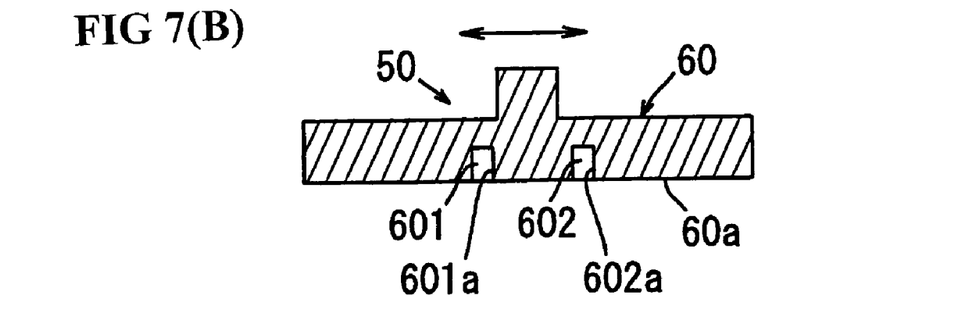
FIG. 7(b) is a sectional view taken along line A-A of FIG. 7(a)

In the chamfering tool 1 according to the embodiment, the circular truncated cone-shaped cutting section 3 is rotated via the shank section 2 fixed to the rotational chuck, but the invention is not limited to this, and the cutting section is oscillated to a direction where the edge of the object to be worked extends so that the edge can be chamfered. For example, as shown in FIGS. 7(a) and 7(b), the cutting section 60 having a planar outer surface 60a is formed, and a first blade section 601 and a second blade section 602 are formed in a sliding direction of the outer surface 60a (in a direction of an arrow in the drawings) with a gap. In such a manner a chamfering tool 50 can be formed.

The first blade section 601 is formed so that its cutting face 601a is tilted to one side of the edge to be chamfered. Further, the second blade section 602 is formed so that its cutting face 602a is tilted to a side opposite to the edge. Since the first blade section 601 and the second blade section 602 are formed in the sliding direction of the outer surface 60a with a gap, they do not interfere with each other. The tool, therefore, can be easily manufactured, and it has no fear of a rise in the manufacturing cost and deterioration of the tool strength.

The above embodiments explain the chamfering of the edge, but the chamfering tool of the present invention is not limited to the use for the chamfering and can be applied to removal of burr occurring on an edge or the like. Further, in the above embodiment, the first blade section and the second blade section are provided to the two places on the outer peripheral surface of the cutting section in the peripheral direction which are symmetrical with respect to a point, but the blade section can be provided to more places. For example, the two first blade sections and the two second blade sections may be provided alternately to four places which are symmetrical with respect to a point in the peripheral direction of the outer peripheral surface, respectively.

The chamfering tool of the present invention is not limited to the above embodiments, and it will be appreciated that modifications may be made in the invention without departing from the gist of the invention.

I claim:

1. A chamfering tool, comprising:
   a cutting section having an outer surface which is formed by one of a plane surface and a curved surface, the cutting section being slidable in a direction where an edge of said chamfering tool extends relatively with respect to an edge of an object to be worked so that the edge of the object is chamfered,
   the outer surface having a first blade section having a first cutting face tilted at a first angle so as to face a first side of the edge of the object, and a second blade section separated from said first blade section by a gap, said second blade section having a second cutting face tilted at a second angle so as to face a direction different from the direction faced by said first cutting face so that a chip cut from the edge of the object in a first direction by said first cutting face is cut in a second direction by said second cutting face to remove it from the edge of the object.

2. A chamfering tool, comprising:
   a shank section to be attached to a rotational chuck; and
   a cutting section associated with a forward end of the shank section and having an outer peripheral surface which is formed by one of a cylindrical rotational surface and a conical rotational surface, the cutting section being capable of being brought into contact with an edge of an object to be worked so that the edge of the object is chamfered, the outer peripheral surface having a first blade section having a first cutting face tilted at a first angle so as to face a first side of the shank section, and a second blade section separated from said first blade section by a gap such that said first and second blade sections are approximately symmetrical around an axis of said shank section, said second blade section having a second cutting face tilted at a second angle so as to face a second side of the shank section, so that a chip cut from the edge of the object in a first direction by said first cutting face is cut in a second direction by said second cutting face to remove it from the edge of the object.

3. The chamfering tool according to claim 2, wherein the first blade section and the second blade section are formed alternately in the peripheral direction of the outer peripheral surface.

4. The chamfering tool according to claim 2, wherein the first blade section and the second blade section are formed so as to be symmetrical with respect to a rotating center axis of the cutting section.

* * * * *